(12) United States Patent
Finkelstein (10) Patent No.: US 7,040,058 B2
(45) Date of Patent: May 9, 2006

(54) ANTI-BIRD ROOSTING DEVICE (76) Inventor: Joseph Finkelstein, 8 Herman Cohen St., Tel Aviv (IL) 64385

( * ) Notice: Subject to any disclaimer, the term of this patent is extended or adjusted under 35 U.S.C. 154(b) by 0 days.

(21) Appl. No.: 10/415,473

(22) PCT Filed: Sep. 11, 2001

(86) PCT No.: PCT/IL01/00861

§ 371 (c)(1),
(2), (4) Date: Apr. 30, 2003

(87) PCT Pub. No.: WO02/19819

PCT Pub. Date: Mar. 14, 2002

(65) Prior Publication Data
US 2004/0040225 A1    Mar. 4, 2004

(51) Int. Cl.
A01M 29/00 (2006.01)
(52) U.S. Cl. ............................. 52/101; 52/60
(58) Field of Classification Search ............. 52/101, 52/60; 119/713, 903; 43/1
See application file for complete search history.

(56) References Cited

U.S. PATENT DOCUMENTS

| 2,258,803 | A | * | 10/1941 | Peles | 52/101 |
| 2,306,080 | A | * | 12/1942 | Peles | 52/101 |
| 2,456,731 | A | * | 12/1948 | Peles | 52/101 |
| 2,475,047 | A | * | 7/1949 | Peles | 52/101 |
| 2,777,171 | A | * | 1/1957 | Burnside et al. | 52/101 |
| 2,888,716 | A | * | 6/1959 | Kaufmann | 52/101 |
| 3,191,239 | A | * | 6/1965 | Moore et al. | 52/101 |
| 3,282,000 | A | * | 11/1966 | Shaw et al. | 52/101 |
| 3,407,550 | A | * | 10/1968 | Shaw | 52/101 |
| 4,962,619 | A | * | 10/1990 | Chatten | 52/101 |
| 5,433,029 | A | * | 7/1995 | Donoho et al. | 43/1 |
| 5,648,641 | A | * | 7/1997 | Guthrie | 174/139 |
| 5,691,032 | A | * | 11/1997 | Trueblood et al. | 428/136 |
| 5,765,319 | A | * | 6/1998 | Callaghan, Jr. | 52/101 |
| 5,799,842 | A | * | 9/1998 | Rumsey | 223/1 |
| D404,107 | S | * | 1/1999 | Dimston | D22/120 |
| 6,098,348 | A | * | 8/2000 | Weaver | 52/101 |
| 6,250,023 | B1 | * | 6/2001 | Donoho | 52/101 |
| 6,457,283 | B1 | * | 10/2002 | Jensen | 52/101 |
| 6,546,676 | B1 | * | 4/2003 | Wiesener et al. | 52/101 |
| 6,589,324 | B1 | * | 7/2003 | Kamo et al. | 106/14.12 |
| 6,718,701 | B1 | * | 4/2004 | Riddell | 52/101 |
| 6,775,950 | B1 | * | 8/2004 | Donoho | 52/101 |

* cited by examiner

Primary Examiner—Carl D. Friedman
Assistant Examiner—Basil Katcheves
(74) Attorney, Agent, or Firm—Edward Langer; Shiboleth, Yisraeli, Roberts, Zisman & Co.

(57) ABSTRACT

An anti-bird roosting device for protecting an area, comprising at least a pair of cooperating base elements mounted on the area to be protected, and a plurality of projecting spikes, supported on the base elements and projecting away therefrom into a space above the area to be protected. The spikes are provided in a pattern of interspersed combinations of vertical, obtuse and acute angle-forming projections, in a high spike density that prevents roosting in the protected space. Thus, each point in the area to be protected is defended by more than one spike, each spike coming from a different direction, so as to cross-defend each other, creating a perimeter envelope defense of the air volume surrounding the base elements. Each device is easily and inexpensively prepared as a continuous mesh, whose dimensions can be constructed in standard sizes or in accordance with the needs of the user. The element diameter is typically approximately two millimeters. The small element diameter makes the entire device hard to see from a distance so that it does not detract from the building's aesthetics.

12 Claims, 8 Drawing Sheets

ANTI-BIRD ROOSTING DEVICE

FIELD OF THE INVENTION

The present invention relates to a new device for preventing birds from landing or perching on exposed surfaces and more specifically to a device comprised of two or more base-member elements, connected to each other, via a plurality of top-members, each top-member having spike end-segments, which are easily configured, so as to supply the user with maximum anti-bird roosting protection.

BACKGROUND OF THE INVENTION

The prior art of anti-bird perching or roosting devices was based on one of several approaches to deter birds from landing. These approaches were either used alone, or in combination one with the other. The approaches may be divided into a number of categories:
  Magnetic
  Optical
  Sloped Surface
  Mechanical: Cables
  Unstable perch
  Projections
  Chemical Several inventors based their devices on the principle of creating a variable magnetic field. This is based on the theory that a magnetic field tends to repel birds. It is believed that birds have a biological instinctive ability to sense the presence of a magnetic field and that the field deters them. U.S. Pat. Nos. 5,884,426 to Ishida; 5,836,114 and 5,918,404 to Ohba are all based on this magnetic approach.

Another approach believes that birds can be deterred by optically frightening them. In U.S. Pat. No. 4,269,008 to Assouline, the inventor utilizes an optical device to frighten the birds.

Yet another approach is to incline the surface exposed to the birds to dissuade them from landing, since the birds desire a horizontal landing surface. In U.S. Pat. No. 5,913,780 to Georgen, there is disclosed a triangular hollow section, whose upper surface is inclined sufficiently to deter the birds.

Other inventors have utilized a cable, or series of parallel cables, running above the surface of interest to interfere with the birds' attempts at landing. In U.S. Pat. No. 5,092,088 to Way, and U.S. Pat. No. 5,713,160 to Heron, the inventors base their devices on this approach.

Destabilizing the exposed perching surface is seen as another way of deterring birds. In U.S. Pat. No. 5,497,585 to Engler, there is disclosed a device having a cable above the surface to be protected and a plurality of rotatable rings on the cable. The dimensions of the rings are such that when birds tried to perch they unbalanced the rings.

A popular method utilizes a base with spikes mounted either perpendicularly, or at various angles with the base. When the birds try to perch, the spikes prick them, thus deterring them. In U.S. Pat. No. 5,400,552 to Negre, there is disclosed a polymethylmethacrylate base, with spikes fitted perpendicularly. This configuration is thought to be less effective because over a period of time, bird feces fills in the gaps between the spikes and then the birds can freely perch.

In U.S. Pat. No. 5,167,099 to Nelson, there is disclosed a plurality of comb-like members each having comb teeth, mounted above the surface to be protected, to deter the birds. This device seems to be costly in terms of production cost.

In U.S. Pat. No. 5,974,998 to Gregg III, there is disclosed a specific solution to the specific problem of preventing birds from landing atop a masthead. The inventor uses upstanding posts on whose upper ends are positioned a plurality of rods. The post is hauled into position with its head above the masthead.

In U.S. Pat. No. 5,691,032 to Trueblood et al, the inventors proposed using a continuous, filled, base strip, in which a plurality of repellant arms is punched into the base strip. This device appears somewhat hazardous to install, as the repellant arms seem to be quite jagged. In addition, the continuous, filled, base strip seems inconvenient to secure to the surface, to be protected.

In U.S. Pat. No. 5,606,830 to Townsend, Jr. et al, the inventors use two vertically inclined panes of open rectangular wire-grid fencing, attached to one another, via hinges. Wire material, above the hinge points, creates upwardly projecting wire prongs. In this device, the protection afforded the surface is limited, as the spikes are almost vertical.

In U.S. Pat. No. 5,253,444 to Donoho et al, there is disclosed a device having a base member and a plurality of top members, each of which holds a plurality of prongs. The device appears to be rigid in construction, which may hinder installation and hamper adaptation to the changing needs of the user.

In addition, there are several chemical bird anti-roosting preparations. These tend to make the surface of the windowsill, etc., sticky. Consequently, dust and other filth adhere to the said surface in a short period of time, rendering the chemical preparation useless. The surface becomes accessible to the birds, once again.

Based on a review of the prior art, it becomes quite evident that each of the approaches employed in the past suffered from shortcomings of some sort or another. In some instances, such as the devices based on magnetic field and optical determent, the effectivity of the devices has not been firmly established. Devices using cables and the like, mounted above the surface of interest, demand a system of supports, which complicate the solution. The approach using a base element coupled with vertically oriented projections would seem less efficient, as bird feces will eventually fill in the gaps between the projections. Continuous, filled, base strip elements would seem to be cumbersome in installation and less given to easy dimensional adaptation.

Therefore, it would be desirable to provide a new anti-bird perching device, which overcomes the shortcomings of the prior art. The device should be lightweight and flexible, to facilitate installation. Also, if the top-element spikes are easily configurable, the device will enable the user to enjoy maximum protection against birds.

SUMMARY OF THE INVENTION

Accordingly, it is a principal object of the present invention to overcome the above mentioned disadvantages and provide a superior device for preventing birds from landing and perching or roosting on exposed surfaces.

In accordance with a preferred embodiment of the present invention, there is provided an anti-bird roosting device for protecting an area, said device comprising:
  at least a pair of cooperating first and second base elements mounted on the area to be protected; and
  a plurality of projecting spikes, supported on said cooperating first and second base elements and originating thereon, and projecting away therefrom into a space above the area to be protected, the arrangement of said projecting spikes being such that a portion of said spikes project inwardly from each of said first and second base elements at various angles and cross one another, such that proximately disposed against a vertically projecting first base element spike there is at least one of said inwardly projecting spikes originating from said second base element to form a barrier having a symmetrical configuration against bird penetration, acting as an internal defense mechanism and prevent roosting of birds within said protected space, said spikes projecting in a pattern, created by interspersing combinations of vertical, obtuse and acute angle-forming projections, said patterns providing a high spike density which prevents roasting in said protected space, defining a full envelope of protection.

In a preferred embodiment, the device is comprised of a plurality of wire base-member elements, connected to each other via a plurality of top-members. Each device is easily and inexpensively prepared, via welding, as a continuous mesh, whose dimensions can be constructed in standard sizes or in accordance with the needs of the user. By way of example, the standard distance between base-member elements, running the length of the mesh, may be ten centimeters. The base-member element portion of the device can, therefore, be easily fabricated as multiples of the standard distance. In each device in this embodiment, the top-member element spikes located at the periphery protect approximately another fourteen centimeters of surface, seven centimeters on each side. By way of example, a device, whose base-member element portion is eighty centimeters, in width, will therefore have a total protected area of ninety-four centimeters. It will be clear to one skilled in the art that all of the above-mentioned measurements may be adapted to the specific needs of the consumer or production requirements.

Thus, each point in the space above the area to be protected is defended by more than one spike, each spike coming from a different direction, so as to cross-defend each other, thus creating a perimeter envelope defense of the air volume surrounding the base elements and above the area to be protected.

The elements in this embodiment may be made of galvanized iron, which has been painted with a protective epoxy coating so as to further enhance its life span, providing the device with both strength and durability. The element diameter is typically approximately two millimeters. The small element diameter makes the entire device hard to see from a distance and therefore the device blends in easily with the background coloring and does not detract from the building's aesthetics. In addition, the devices are easily painted. This provides anti-rusting protection and adds to the longevity and aesthetics of the device.

In an alternative embodiment, the elements can be made of plastic, metals other than iron or any appropriate material.

The construct is easily mounted on horizontal, vertical or slanted areas, as the base elements are easily clamped to the various mounting surfaces. This easy mounting is time saving. The element dimensions and device geometry allow for easy handling by the installation technician. The easy mounting and handling make the device inexpensive to install.

When the device is mounted on a flat surface, horizontal, vertical or slanted, the spikes project outwardly into the space above the area to be protected so as to provide up to a full envelope of protection of 180 degrees.

The construct can also be wrapped around corners, rooftops and pipes. When the device is mounted on a cylindrical surface, horizontal, vertical or slanted, the spikes project outwardly into the space above the area to be protected so as to provide up to a full envelope of protection of 360 degrees.

In addition, the construct's dimensions can easily be modified to fit the user's changing requirements. If the user decides to transfer the specific construct to a wider surface or to a longer surface, the construct's length and width are easily modified.

In another preferred embodiment, the material from which the elements are made is a ductile metal and therefore, easily worked. The spike projections of the top-elements may be configured into a variety of angles. This enables the user to enjoy a maximum envelope of protection against various birds. These projections can be positioned so as to create various angles, which range from acute to obtuse, and not only the vertical angles existing in previous anti-bird roosting or perching devices.

Additional features and advantages of the invention will become apparent from the following drawings and descriptions.

BRIEF DESCRIPTION OF THE DRAWINGS

For a better understanding of the invention with regard to the embodiments thereof reference is made to the accompanying drawings, in which like numerals designate corresponding elements or sections throughout.

DETAILED DESCRIPTION OF A PREFERRED EMBODIMENT

Figure 1A:
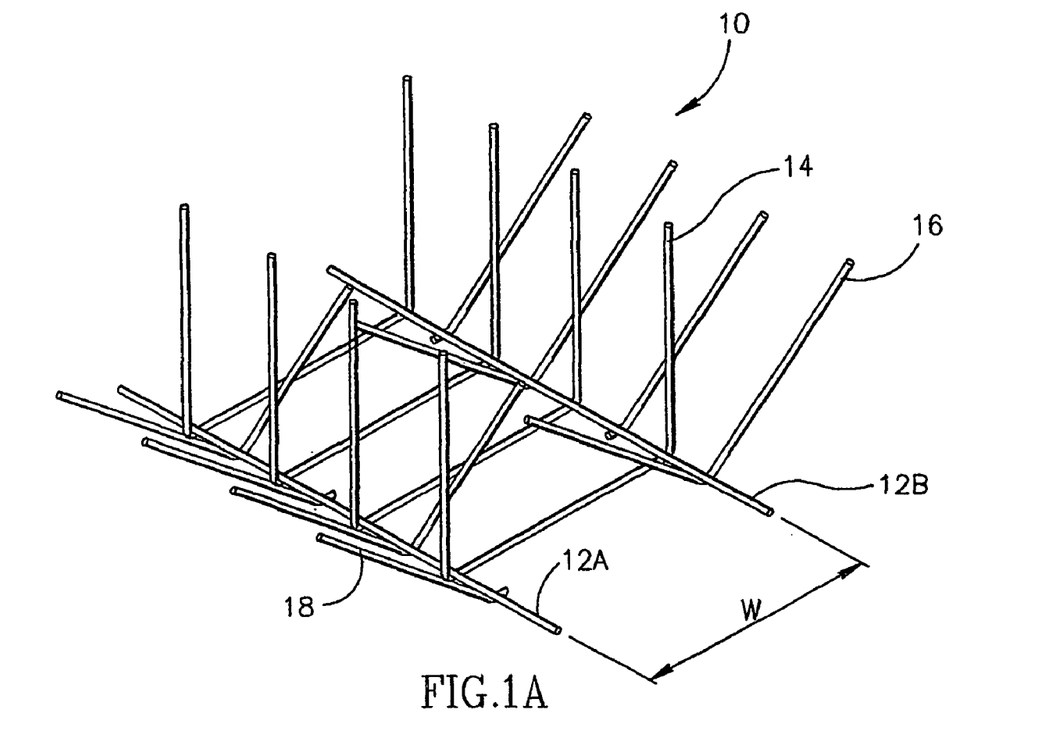
FIG. 1A shows a perspective view of a preferred embodiment of a two base-member element construct of an anti-bird roosting device in accordance with the principles of the present invention.

Referring now to FIG. 1A, there is shown a perspective view of the preferred embodiment of a lightweight, easily mounted and easily configured anti-bird roosting device 10, constructed in accordance with the principles of the present invention. The device 10 comprises a plurality of base-member elements 12a–b, which run parallel, one with the other, and a plurality of top-member spike elements, fabricated as several variant forms, shown in FIGS. 1A–1B. Hereafter, the term "variant" will be used to indicate an alternate form of the spike element, using the same reference number.

In FIG. 1A, top-member spike element variants 14 connect the base-member elements, one to another. The spikes of this top-element variant project vertically, in this embodiment. Spike element variants 16 and 18 are each bent into an angular form. In variant 16, both arms are equal in length, one arm projects inwardly and one arm projects outwardly. In variant 18, one arm is very short, essentially a welding support, and the other arm projects outwardly. In FIG. 1A, variant 16 is shown mounted on the right-hand base-member element, 12b, and variant 18 is shown mounted oppositely on the left-hand base-member element, 12a. Similarly, where variant 16 is mounted on the left-hand base-member element, 12a, variant 18 is shown mounted oppositely on the right-hand base-member element, 12b.

As shown in FIG. 1A, the top-member spike element variants form repeat patterns along the length of the device. This repeat structure enables compact storage and easy shipment, as the devices 10 may be easily placed one on top of another.

In FIG. 1A, there is shown a typical width, W, of device 10. A device 10, having a single width, W, is defined as a module, which can be provided in a multiplicity to allow coverage of a large surface area.

Figure 1B:
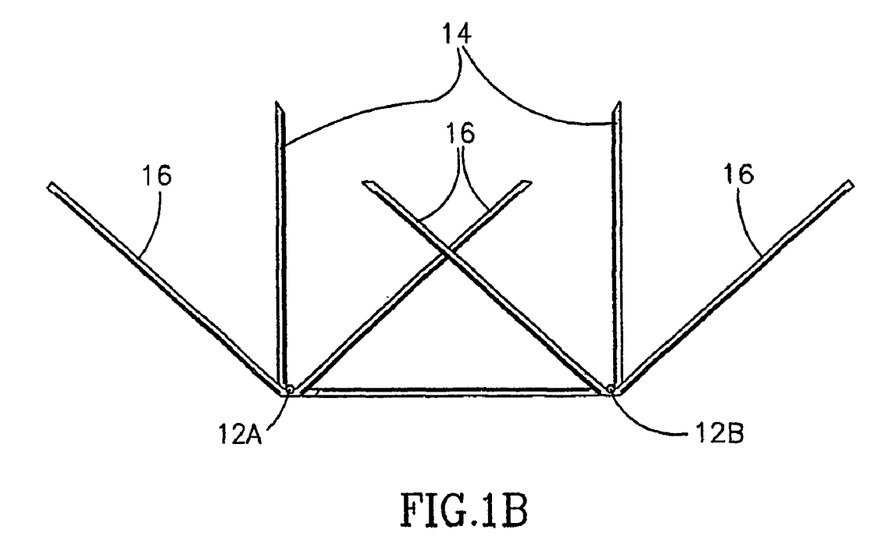
FIG. 1B shows an end view of the preferred embodiment, depicting a grouping of top-element spike variants, in accordance with the principles of the invention.

As shown in FIG. 1B, device 10 can, if so desired, provide a total envelope of protection against bird roosting, which is afforded by the high spike density and projecting configuration of the spike elements 14, 16, 18. As the variant 16 and variant 18 spikes do not project vertically, while variant 14 does, the three variants supplement one another to provide maximum protection.

Figure 2A:
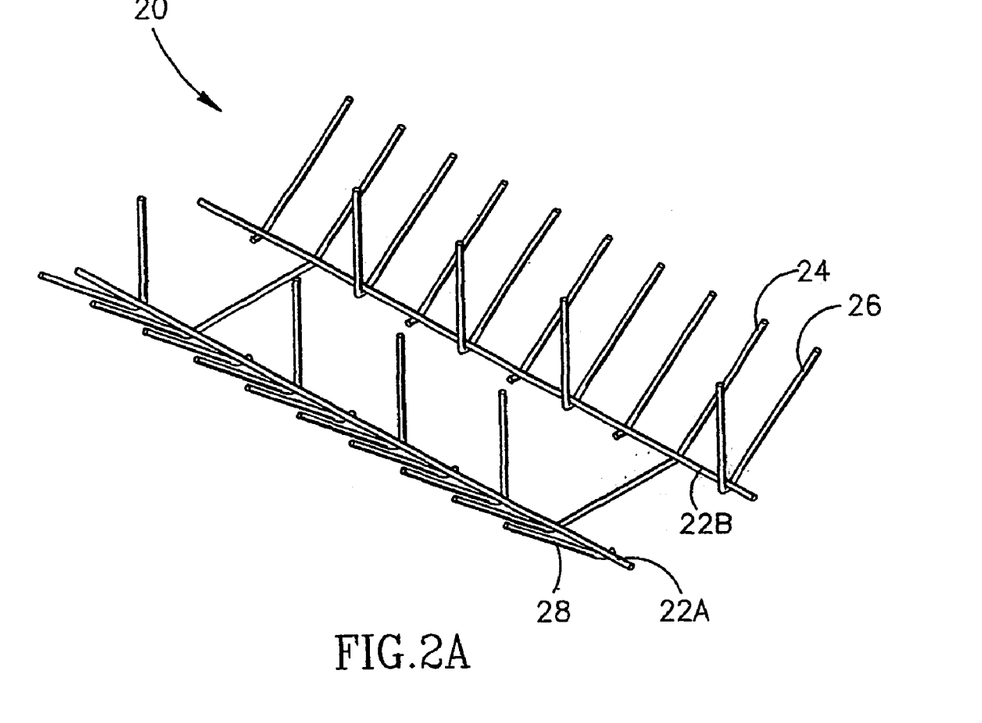
FIG. 2A shows a perspective view of an alternative embodiment of a two base-member element construct of an anti-bird roosting device.

Referring now to FIG. 2A, there is shown a perspective view of an alternative embodiment of a lightweight, easily mounted and easily configured anti-bird roosting device 20, constructed in accordance with the principles of the present invention. The device 20 comprises a plurality of base-member elements 22a–b which run parallel, one with the other, and a plurality of top-member spike elements, fabricated as several variant forms. The base-member elements 22a–b are connected to one another by every seventh top member 24. Thus, device 20 is less rigid than device 10 because there are less top-member spike elements 24, which connect the base-member elements 22a–b, one to another.

In FIG. 2A, the spikes of the top-element variants 24 project outwardly, in this embodiment. Variant 26 and variant 28 top-member elements are each bent into an angular form. In variant 26, both arms are equal in length, one arm projects vertically and one arm projects outwardly. In variant 28, one arm is very short, essentially a welding support, and the other arm projects outwardly.

In FIG. 2A, variant 26 is shown mounted on the right-hand base-member element, 22b, and variant 28 is shown mounted oppositely on the left-hand base-member element, 22a. When variant 26 is mounted on the left-hand base-member element, 22a, then variant 28 is mounted oppositely on the right-hand base-member element, 22b.

Figure 2B:
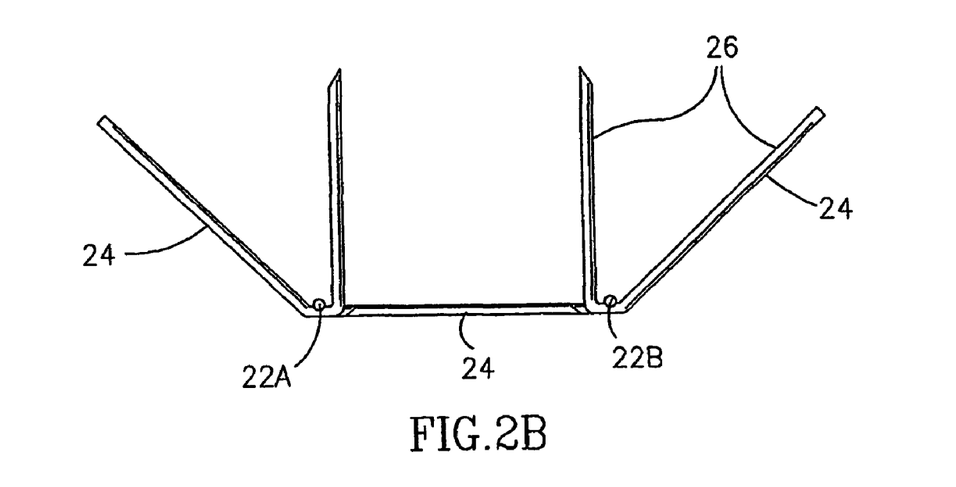
FIG. 2B shows an end view of the alternative embodiment, depicting a grouping of top-element spike variants.

As shown in FIG. 2B, device 20 provides excellent protection against bird roosting, due to the configuration of the spike projections. As all the variant spikes do not only project vertically, the variants supplement one another to provide maximum protection.

Figure 2C:
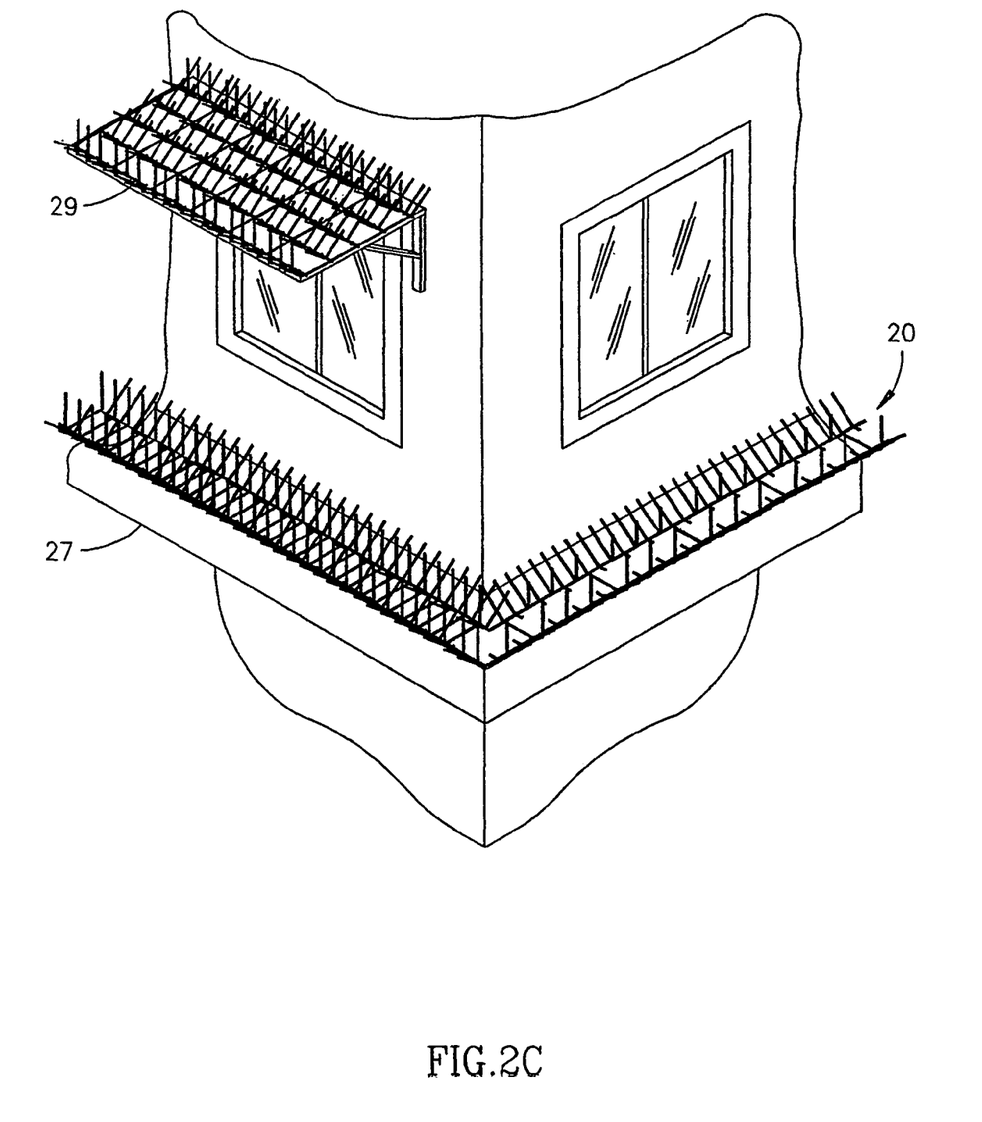
FIG. 2C shows a perspective view of the alternative embodiment, as mounted on a windowsill.

In FIG. 2C, the anti-bird roosting device 20 is shown mounted on a windowsill 27 and on a clothesline overhang 29. The small wire gauge, of the base-member elements, facilitates easy mounting (clamping, etc.) on the various surface materials. In addition, as the total construct is comprised of thin elements, which are not easily seen from a distance, the anti-bird roosting devices 20 do not detract from the aesthetics of the building.

Figure 2D:
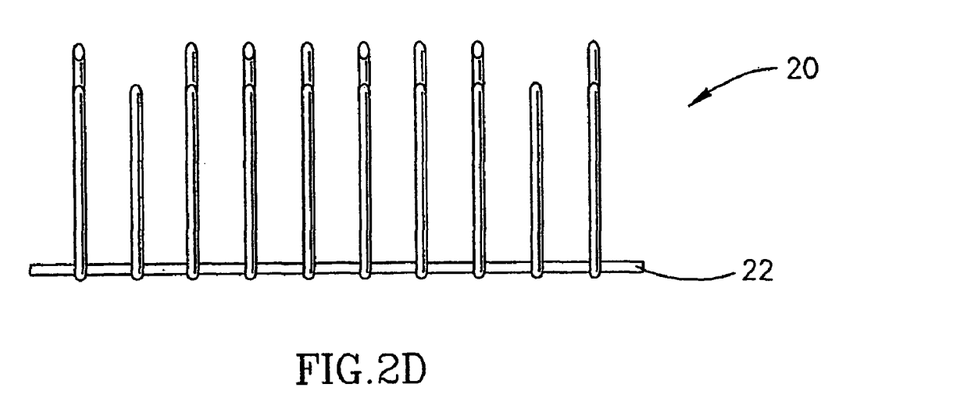
FIGS. 2D–2E are, respectively, side and top views of the anti-bird roosting device, shown in FIG. 2B.
Figure 2E:
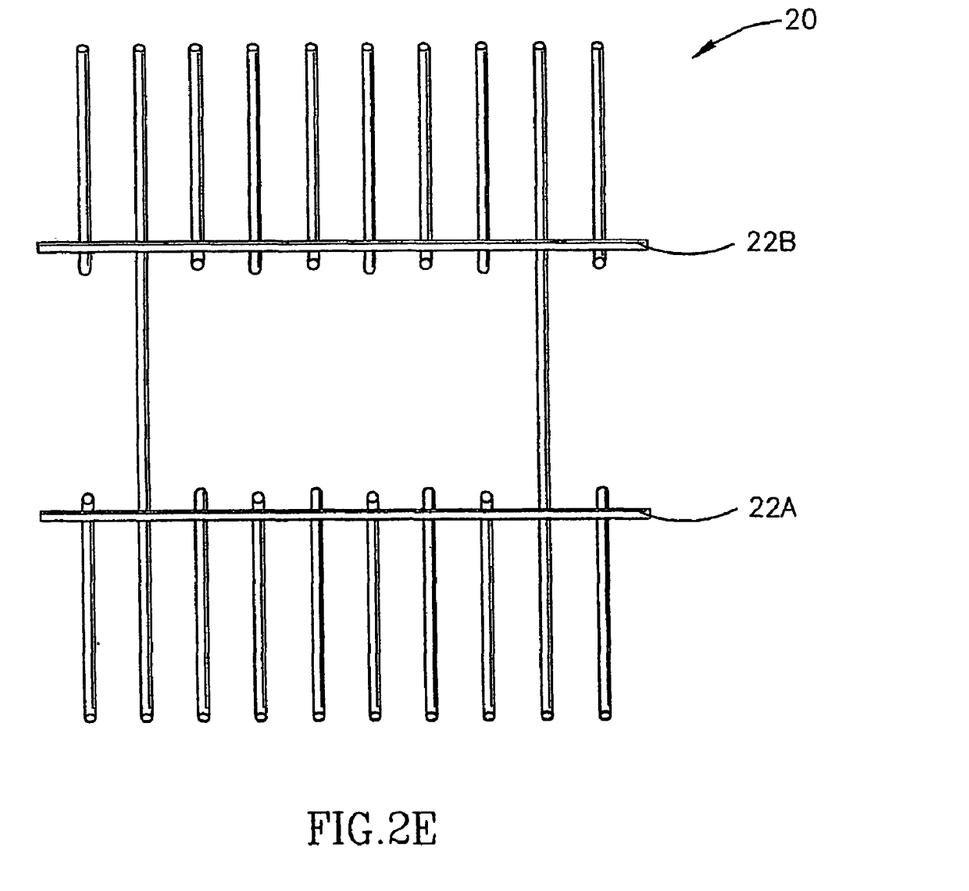

FIGS. 2D–2E are, respectively, side and top views of the anti-bird roosting device 20, shown in FIG. 2B, revealing further construction details.

Figure 3A:
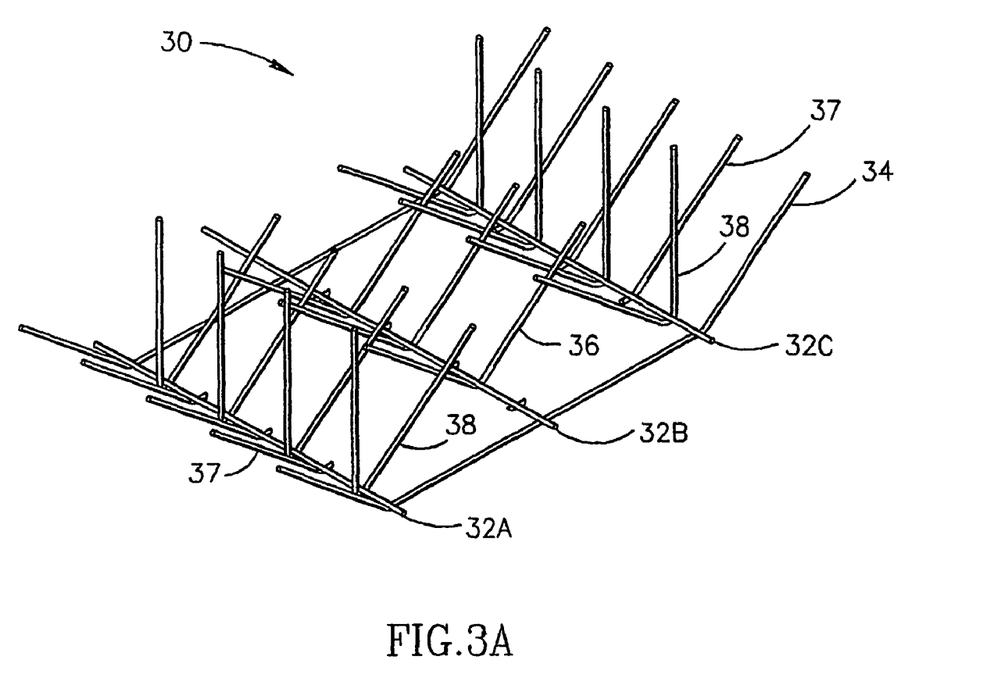
FIG. 3A shows a perspective view of a second alternative embodiment, featuring a three base-member element construct of the anti-bird roosting device.

FIG. 3A shows a perspective view of another alternative embodiment featuring a high spike density, three base-member element anti-bird roosting device 30, having base members being connected one to the other via a plurality of top-member spike elements. The device 30 comprises a construct having a plurality of base-member elements 32a, b, c, which run parallel one to the other, and a plurality of top-member spike elements, fabricated as several variant forms 34, 36, 37, 38.

In FIG. 3A, variant 34 top-member spike elements connect the base-member elements, one to another. The spikes of this top-element variant project outwardly, forming acute and obtuse angles with the base line. Variant 36 is an equal arm-length angular form, whose end segments project outwardly. In this embodiment, variants 36 are positioned on the middle base element 32b. Variant 37 is an unequal arm-length angular form, whose longer arm projects outwardly. It is connected to the external base-elements 32a, 32c in the construct. Variant 38 is, also, an unequal arm-length angular form. One arm projects vertically and the other projects inwardly. Variants 38 are connected to the external base-elements 32a, 32c in the construct. In this embodiment, variants 37 and 38 alternate along the length of the external base-elements 32a, 32c in the construct.

Figure 3B:
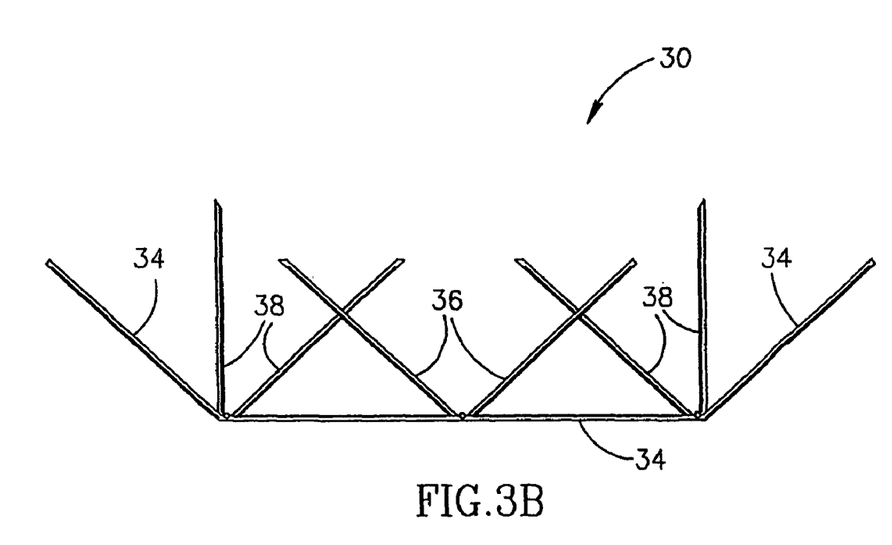
FIG. 3B shows an end view of the construct shown in FIG. 3A, depicting a grouping of top-element spike variants.

As shown in FIG. 3B, device 30 provides a total envelope of protection against bird perching, due to the configuration of the spike projections. As all the variant spikes do not only project vertically, the variants supplement one another to provide maximum protection.

Figure 3C:
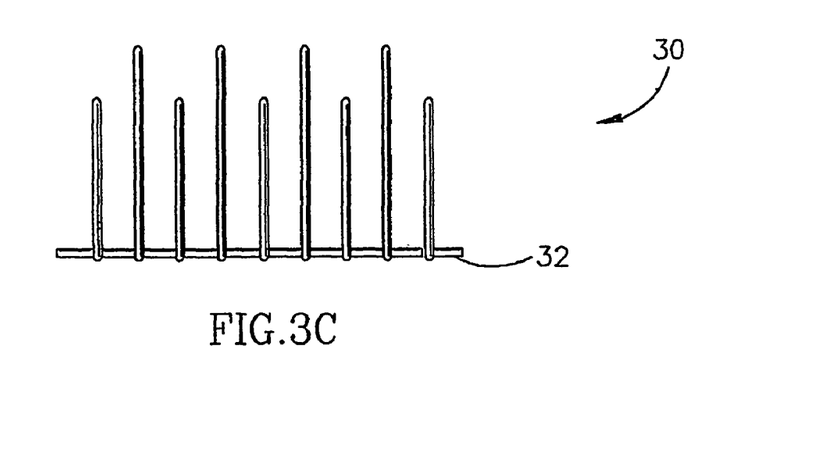
FIGS. 3C–3D are, respectively, side and top views of the anti-bird roosting device, shown in FIG. 3A.
Figure 3D:
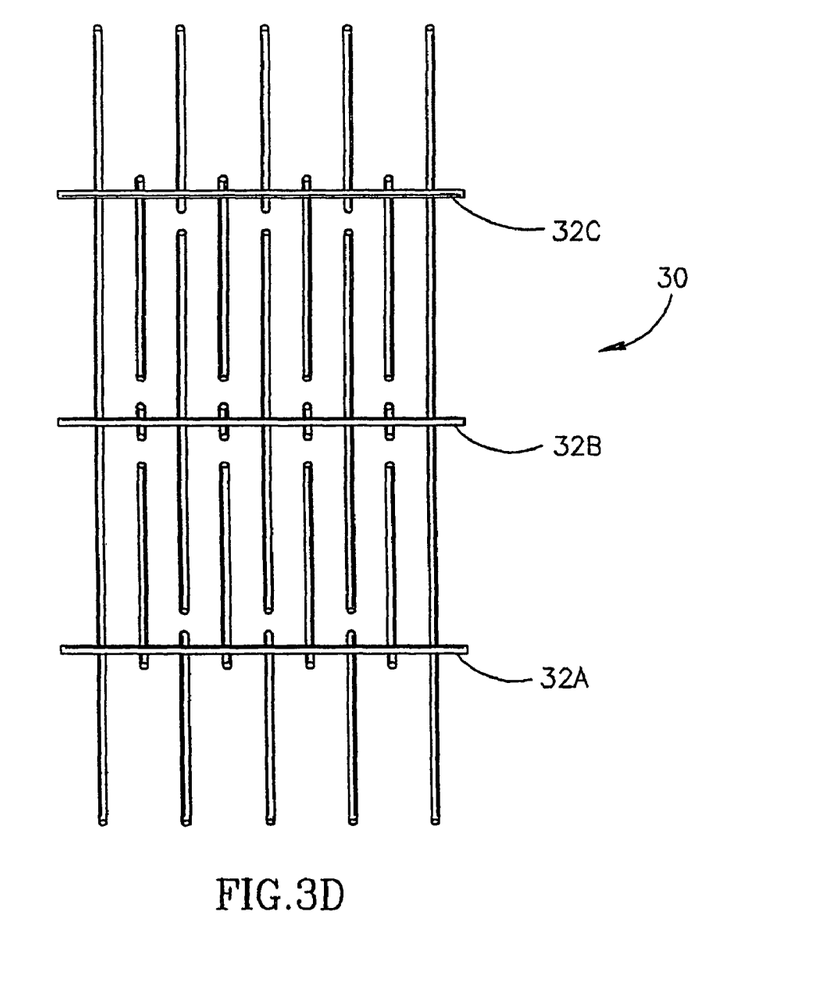

FIGS. 3C–3D are, respectively, side and top views of the anti-bird roosting device 30, shown in FIG. 3A, revealing further construction details.

Figure 4A:
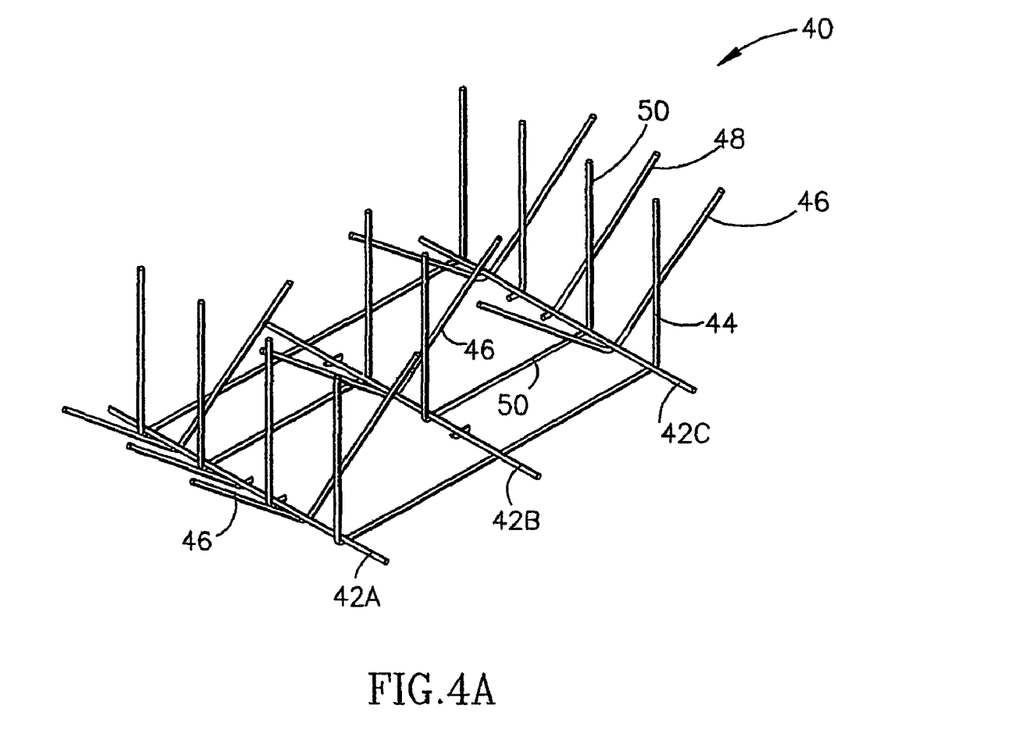
FIG. 4A shows a perspective view of a higher spike density, three base-member element construct of the anti-bird roosting device.

FIG. 4A shows a perspective view of another alternative embodiment featuring a higher spike density, three base-member element anti-bird roosting device 40, having base members being connected one to the other via a plurality of top-member spike elements. The device 40 comprises a construct having a plurality of base-member elements 42a, b, c, which run parallel one to the other, and a plurality of top-member spike elements, fabricated as several variant forms 44, 46, 48, 50. Device 40 is stronger than device 30 because there are more connections between the base elements. However, the additional connections are via top element variants 50, which only connect two base elements at a time. Therefore, although the construct is strengthened, much flexibility is still retained. In addition, the added spikes augment the already existing protection envelope.

In FIG. 4A, both top-member spike element variants 50 and 44 connect the base-member elements 42a–c, one to another. The spikes of both these top-element variants project vertically. Variant 46 is an equal arm-length angular form, whose end segments project outwardly, when mounted on the central base element 42b. However, when variant 46 is mounted on the external base elements 42a, 42c, one arm projects outwardly and the other projects inwardly. Variant 48 is an unequal arm-length angular form, whose longer arm projects outwardly. Variants 48 are connected to the external base-elements 42a, 42c in the construct.

Figure 4B:
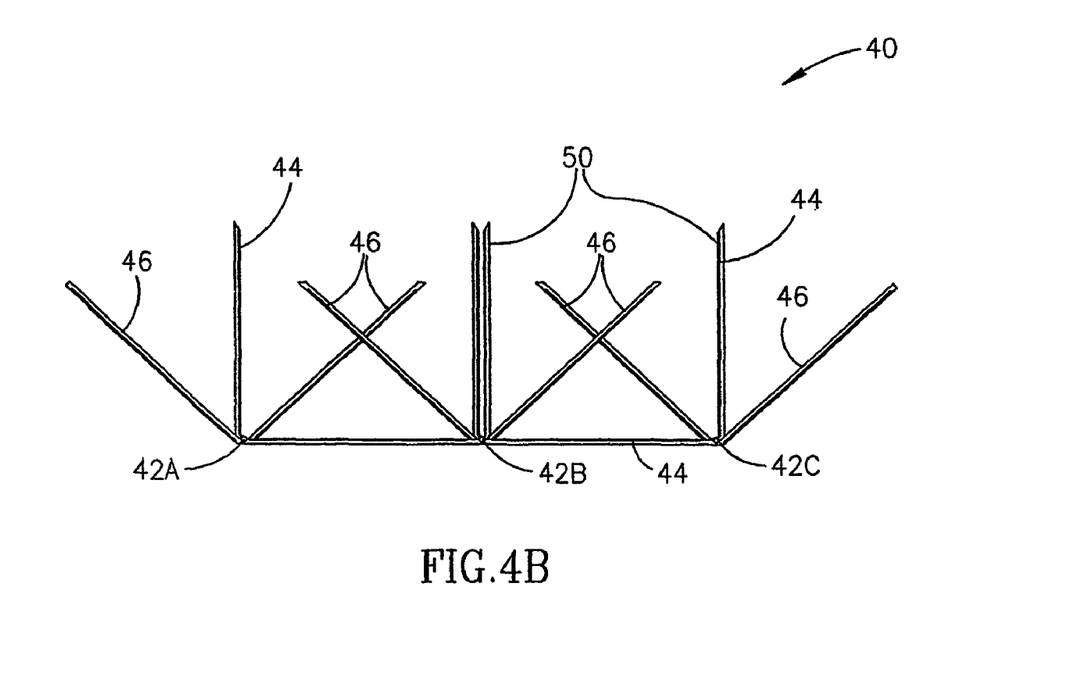
FIG. 4B shows an end view of the construct shown in FIG. 4A, depicting a grouping of top-element spike variants.

As shown in FIG. 4B, device 40 provides a total envelope of protection against bird roosting, which is afforded by the configuration of the spike projections. As the variant spikes do not only project vertically, the variants supplement one another to provide maximum protection.

Figures 4C, 4D:
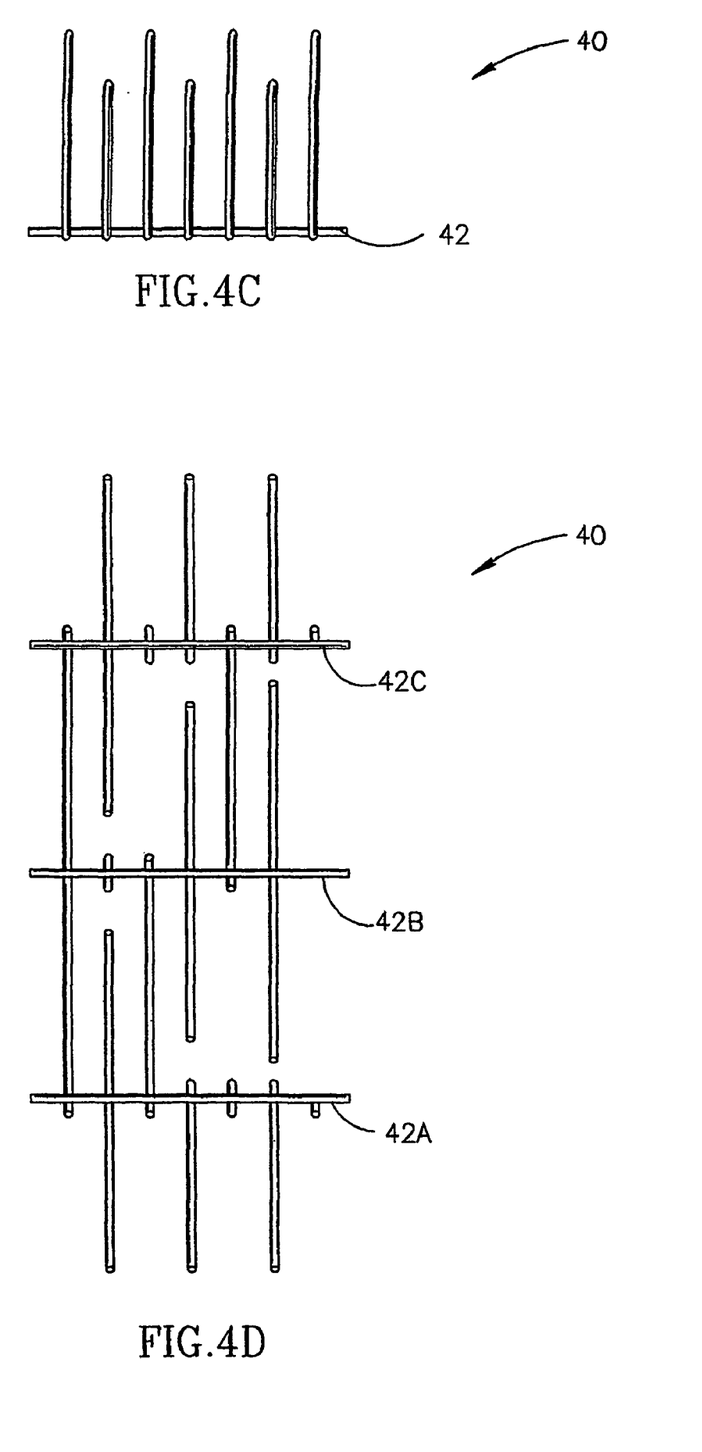
FIGS. 4C–4D are, respectively, side and top views of the anti-bird roosting device, shown in FIG. 4

FIGS. 4C–4D are, respectively, side and top views of the anti-bird roosting device 40, shown in FIG. 4A, revealing further construction details.

In summary, the present invention provides a superior device for preventing birds from landing and perching on exposed surfaces, and enables the user to enjoy a maximum envelope of protection against various birds. The spike element projections can be positioned so as to create various angles, which range from acute to obtuse, and not only the vertical angles existing in previous anti-bird roosting and perching devices Having described the invention with regard to certain specific embodiments thereof, it is to be understood that the description is not meant as a limitation, since farther modifications may now become apparent to those skilled in the art, and it is intended to cover such modifications as fall within the scope of the appended claims.

The invention claimed is:

1. An anti-bird roosting device for protecting an area, said device comprising:
    a series of connected cooperating equally spaced apart parallel base elements mounted on the area to be protected; and
    a plurality of projecting spikes, supported on said cooperating base elements and originating thereon, and projecting away therefrom into a space above the area to be protected, the arrangement of said projecting spikes being such that a first type of said spikes project substantially perpendicular to each of said cooperating base elements and a second type of said spikes are spaced apart and project inwardly from each of said cooperating base elements at various angles and cross one another, such that proximately disposed against a perpendicularly projecting first spike type there is at least one of said inwardly projecting second type spikes originating from another cooperating base element to form a barrier having a symmetrical configuration against bird penetration, acting as an internal defense mechanism and prevent roosting of birds within said protected space,
    said spikes projecting in a pattern, created by interspersing combinations of vertical, obtuse and acute angle-forming projections, said pattern providing a high spike density which prevents roosting in said protected space, defining a full envelope of protection,
    wherein said cooperating base elements are spaced apart by a single predetermined width, defining a symmetrical module, and wherein a plurality of said symmetrical modules are provided to allow coverage of a large surface area to be protected,
    in a single, wide protection envelope without gaps between said plurality of symmetrical modules.

2. The device of claim 1 wherein said projecting spikes form vertical, obtuse and acute angles with respect to said base elements.

3. The device of claim 1 arranged for mounting on a flat surface, having at least one of horizontal, vertical and slanted orientations, said spikes projecting outwardly and inwardly into said space above the area to be protected so as to provide a full envelope of protection of up to approximately 180 degrees.

4. The device of claim 1 arranged for mounting on a cylindrical surface, having at least one of horizontal, vertical and slanted orientations, said spikes projecting outwardly and inwardly into said space above the area to be protected so as to provide a full envelope of protection of up to 360 degrees.

5. The device of claim 1, wherein said base elements are spaced apart by a dimension which is easily adaptable to protect larger surface areas.

6. The device of claim 1, wherein said projecting spikes form repeat patterns along the length of said device.

7. The device of claim 1 in an arrangement comprising a plurality of said devices, wherein said projecting spikes of said devices are interleaved to enable easy, compact storage and easy shipment, by placing said devices one on top of another.

8. The device of claim 1, wherein said base elements have a small wire gauge, facilitating easy mounting of said device on a mounting surface, thereby saving time during installation.

9. The device of claim 1, wherein said base elements have a small wire gauge, and are not easily seen from a distance, so as not to detract from the aesthetics of a building or other surface on which said device is mounted.

10. The device of claim 1, wherein said base elements and said plurality of projecting spikes have a small wire gauge, allowing for easy handling and mounting, making the device inexpensive to install for the end-user.

11. The device of claim 1, wherein said base elements and said plurality of projecting spikes are easily painted, providing anti-rust protection which adds to the longevity and aesthetics of the device.

12. The device of claim 1 wherein said base elements are of a wire gauge suitable to provide the device with a strong, durable design.

* * * * *